(12) United States Patent
Levi et al.

(10) Patent No.: US 6,445,542 B1
(45) Date of Patent: Sep. 3, 2002

(54) AIR BEARING SLIDER

(75) Inventors: Pablo G. Levi, Sunnyvale; Bill Sun; Manuel Anaya-Dufresne, both of Fremont; Pravin Prabhu, Morgan Hill, all of CA (US)

(73) Assignee: Read-Rite Corporation, Fremont, CA (US)

( * ) Notice: Subject to any disclaimer, the term of this patent is extended or adjusted under 35 U.S.C. 154(b) by 0 days.

(21) Appl. No.: 09/519,150

(22) Filed: Mar. 6, 2000

(51) Int. Cl.$^7$ ................................................. G11B 5/60
(52) U.S. Cl. ............................... 360/236.5; 360/235.4; 360/235.7; 360/236.3
(58) Field of Search ........................... 360/235.6, 235.7, 360/236.3, 236.4, 236.5, 237, 235.4

(56) References Cited

U.S. PATENT DOCUMENTS

| | | |
|---|---|---|
| 4,692,832 A | 9/1987 | Bandara et al. |
| 4,785,161 A | 11/1988 | Strom |
| 4,835,361 A | 5/1989 | Strom |
| 4,948,460 A | 8/1990 | Sandaiji et al. |
| 5,012,572 A | 5/1991 | Matsuzawa et al. |
| 5,020,213 A | 6/1991 | Aronoff et al. |
| 5,297,330 A | 3/1994 | Matsuzawa et al. |
| 5,327,638 A | 7/1994 | Haines et al. |
| 5,509,554 A | 4/1996 | Samuelson et al. |
| 5,528,819 A | 6/1996 | McKay et al. |
| 5,537,732 A | 7/1996 | Fukuda et al. |
| 5,687,045 A | 11/1997 | Okai et al. |
| 5,926,343 A | 7/1999 | Dorius et al. |
| 5,926,344 A | 7/1999 | Kimura |
| 5,939,133 A | 8/1999 | Ganapathi et al. |
| 5,967,880 A | 10/1999 | Major |
| 6,007,664 A | 12/1999 | Kuizenga et al. |
| 6,137,656 A | 10/2000 | Levi et al. |
| 6,144,528 A * | 11/2000 | Anaya-Dufresne et al. ...... 360/235.4 |
| 6,233,118 B1 * | 5/2001 | Boutaghou et al. ...... 360/235.4 |

FOREIGN PATENT DOCUMENTS

| | | |
|---|---|---|
| EP | 0013363 A1 | 7/1980 |
| EP | 0335732 B1 | 10/1989 |
| EP | 0361809 B1 | 4/1990 |
| EP | 0432869 A2 | 6/1991 |
| EP | 0442660 B1 | 8/1991 |
| EP | 0449535 B1 | 10/1991 |
| EP | 0499473 B1 | 8/1992 |
| EP | 0543637 B1 | 5/1993 |
| EP | 0583985 A2 | 2/1994 |
| EP | 0617408 A2 | 9/1994 |
| JP | 11144416 A | 5/1989 |
| JP | 07182623 A | 7/1995 |
| JP | 08083416 A | 3/1996 |
| JP | 08129716 A | 5/1996 |
| JP | 08190711 A | 7/1996 |
| JP | 09212836 A | 8/1997 |
| JP | 09297908 A | 11/1997 |
| JP | 10106130 A | 4/1998 |
| JP | 10247367 A | 9/1998 |
| JP | 10302237 A | 11/1998 |
| JP | 11007603 A | 1/1999 |
| JP | 11086250 A | 3/1999 |
| WO | WO98/16931 | 4/1998 |

* cited by examiner

Primary Examiner—Craig A. Renner

(57) ABSTRACT

A slider includes an air bearing surface (ABS) including a plurality of separate coplanar pads, a cavity recessed to a certain depth beneath the level of the ABS, and a plurality of steps in which each step is disposed at a level between that of the ABS and that of the cavity. The plurality of steps include a trailing edge step and a leading edge step, and in some embodiments a first side step and a second side step. The leading edge step is provided at a level deeper than that of the trailing edge step. The first side step and the second side step may be provided at the same or different levels to tailor the flight characteristics of the slider. A process is also disclosed for the fabrication of a slider of the present invention. The process includes at least three cycles of masking, etching, and stripping in order to form at least three successively deeper levels, the deepest level being the cavity. Selective masking of the substrate allows portions of the substrate to be preserved through successive etching operations to become the ABS and the plurality of steps.

13 Claims, 8 Drawing Sheets

AIR BEARING SLIDER

BACKGROUND OF THE INVENTION

This invention relates generally to methods for fabricating air bearing surfaces of sliders for magnetic disk drives and the sliders so produced.

Magnetic disk drives are used to store and retrieve data for digital electronic apparatus such as computers. In FIGS. 1A and 1B, a magnetic disk drive 1 of the prior art includes a sealed enclosure 2, a disk drive motor 3, a magnetic disk 4, supported for rotation by a spindle 5 of motor 3, an actuator 6 and an arm 7 attached to a spindle 8 of actuator 6. A suspension 9 is coupled at one end to the arm 7, and at its other end to a read/write head or slider 10. The slider 10 typically includes an inductive write element with a sensor read element As the motor 3 rotates the disk 4, as indicated by the arrow R, a layer of air proximate to the surface of the disk 4 is swept along with the disk 4. This layer of air, commonly known as windage, pushes against the slider 10 and allows the slider 10 to lift off the surface of the disk 4 and "fly" on an air bearing formed beneath it. Various magnetic "tracks" of information can be read from the magnetic disk 4 as the actuator 6 is caused to pivot in a short arc as indicated by the arrows P. The design and manufacture of magnetic disk drives 1 is well known to those skilled in the art.

FIG. 2 shows a slider 10 of the prior art. The side of the slider 10 facing up in the drawing is the side that faces the disk 4. Thus, the highest features in the drawing are those that are closest to the disk 4 when the disk drive 1 is in operation. The slider 10 has a generally rectangular shape with a leading edge 20, a trailing edge 22, a first side 24 and a second side 26. Slider 10 further includes an air bearing surface (ABS) comprising a trailing edge pad 28, a first leading pad 30 and a second leading pad 32, and in some prior art designs also includes a first side pad 34 and a second side pad 36. The slider 10 additionally includes a leading edge step 38, a trailing edge step 40, and a cavity 42. In some prior art embodiments the slider 10 also includes a first side step 44 and a second side step 46.

During manufacture, the slider 10 is etched from a single body, typically made of a two phase mixture of aluminum oxide and titanium carbide. The steps of the manufacturing process are generally illustrated in FIGS. 3A–3H and employ photolithography methods that are well known in the art. FIGS. 3A–3H show a crosssection of the slider 10 along the line 3—3 in FIG. 2 through successive steps. In FIG. 3A a body 48 that may have a nominally curved surface is covered with a photoresist layer 50. The photoresist layer 50 is patterned and developed, and then any undeveloped material is washed away to leave a photoresist mask 52 as shown in FIG. 3B. Next, the body 48 is etched to remove material that is not protected by the photoresist mask 52. As shown in FIG. 3C, the etching creates a first surface that is recessed below the level of the initial surface by a depth $H_1$. FIG. 3D shows the formed trailing edge pad 28 after the first photoresist mask 52 is stripped away. The steps of FIGS. 3A–3D are then repeated in FIGS. 3E–3H. A second photoresist layer 56 is formed over the body 48 as shown in FIG. 3E. The photoresist layer is formed into a second photoresist mask 58 in FIG. 3F, and the body 48 is again etched in FIG. 3G to create a second surface recessed below the initial surface by a depth $H_2$. FIG. 3H shows the slider 10 after the second photoresist mask 58 has been stripped away to reveal the leading edge step 38 and the cavity 42.

Accordingly, as can be seen in FIG. 2, the prior art provides for two etching steps to create features at three different heights. The pads 28, 30, 32, 34, and 36 that form the ABS represent the only portions of the initial surface that remain after the two etching operations. The steps 38, 40, 44, and 46 all are recessed beneath the ABS by a depth of $H_1$, while the cavity 42 is recessed beneath the ABS by a depth of $H_2$.

During operation of the disk drive 1 air that is swept along with the spinning disk 4, commonly known as windage, first encounters the leading edge 20, and leading edge pads 30, 32 and leading edge step 38. As the air flow passes between the leading edge pads 30, 32 and the disk 4 a lifting force is developed that tends to drive the slider 10 away from the disk 4. Another portion of the air flow, however, passes through a gap 60 between the leading edge pads 30, 32, over the leading edge step 38, and over the cavity 42. As the air expands over cavity 42 the pressure drops and a partial vacuum is developed that tends to draw the slider 10 towards the disk 4. In stabile flight, the downward force and the upward force are in equilibrium and the slider 10 maintains a generally constant height above the disk 4, commonly known as the fly height (FH).

FIG. 4 illustrates an attitude of a slider 10 in stabile flight over a disk 4. The drawing shows how the slider 10 flies with the leading edge 20 elevated relative to the trailing edge 22 such that the plane defined by the ABS forms an angle α to the disk 4. The fly height, FH, of the slider 10 is typically defined as the distance between the trailing edge 22 and the disk 4 since the transducer is commonly located along the trailing edge 22 adjacent to the trailing pad 28. Pads 28, 34, 36 of the ABS are designed to cooperate with the leading edge pads 30, 32 to regulate, for example, the pressure drop experienced over the cavity 42. The combination of the pads 28, 30, 32, 34, 36 and the steps 38, 40, 44, 46 also influences the angle α, also known as the pitch, the degree of rotation around the longitudinal line 33 known as roll, and the resistance slider 10 exhibits to changes in its flight characteristics, commonly referred to as stiffness. Stiffness with respect to fly height is especially desirable, but additionally stiffness is also desirable with respect to pitch and roll.

In prior art designs, in order to increase the pitch angle of a slider, the combined surface area of the leading edge pads 30, 32 is increased at the expense of the surface area of the cavity 42. Increasing the surface area of the leading edge pads 30, 32 creates greater lift under the leading edge 20 causing the pitch to rise. Reducing the cavity surface area, however, reduces the volume enclosed by the cavity surface and the surrounding pads and steps. It has been found that reducing this volume also reduces the stiffness of the slider in flight. Therefore, in the prior art raising the pitch angle has been found to result in a tradeoff in stiffness.

Another well known configuration for a slider 10, commonly referred to as side rail design, positions the trailing pad 28 and the transducer (not shown) close to either first side 24 or second side 26 of the slider 10. A slider 10 with a side rail design preferably will have a controlled degree of roll so that the side 24 or 26 nearest to the transducer will be closest to the disk 4.

As will be appreciated by those skilled in the art, the dimensions of the various features of slider 10 are carefully designed to control flight characteristics such as fly height, pitch, roll, and their respective stiffnesses. It will also be appreciated that the design process must also take into account factors such as the rotation rate of the disk 4 and the need to avoid the accumulation of debris on the slider 10. Modifications to the dimensions of the various features in the design process necessarily creates tradeoffs in the flight characteristics of slider 10. For example, increasing the size of the cavity 42 at the expense of the size of the leading edge pads 30, 32 will tend to cause the slider 10 to fly closer to the disk 4.

Further, during the manufacturing process, deviations in the dimensions of the various features within the established tolerance ranges will create deviations in the flight performances of individual sliders 10. Thus, deviations in the surface area of trailing edge pad 28 around some nominal value will tend to result in deviations in the fly height of slider 10. For example, a variation of 1 microinch ($\mu"$) in the depth $H_1$ of the leading edge step 38 and the trailing edge step 40 in a particular prior art slider 10 might result in a variation in its fly height of $0.1\mu"$. In the foregoing example the sensitivity of the fly height to step depth $H_1$ would be $0.1\mu"/\mu"$ or just 0.1. It will be readily appreciated that lower sensitivity values are desired as they indicate that sliders 10 will be more uniform one to the next in operation which can permit lower fly heights to be achieved reliably. Therefore, it is desirable to identify designs that reduce the sensitivities of the various flight characteristics to deviations within the manufacturing tolerances of the various features on the slider 10.

What is desired, therefore, is a process for manufacturing a slider that allows for greater flexibility in its design. It is further desired to create a slider with flight characteristics that are less sensitive to deviations within set manufacturing processes.

SUMMARY OF THE INVENTION

The present invention provides for an improved slider for a magnetic disk drive. The slider is provided with an air bearing surface (ABS) comprising a pair of leading edge pads and a trailing edge pad having surfaces that are substantially coplanar, a cavity that is a surface recessed below the ABS, and a plurality of steps disposed at heights intermediate between the ABS and the cavity. The steps include at least a leading edge step and a trailing edge step, each at a different depth beneath the ABS. The trailing edge step, located at a first depth, is positioned such that it is disposed between the ABS and the leading edge step, located at a second depth. The leading edge step is likewise disposed between the trailing edge step at a first depth and the cavity at a third depth. This configuration provides an advantage to a slider of the present invention over those of the prior art in that it allows the slider to fly with a larger pitch angle without sacrificing stiffness. It has been found that the pitch angle can be increased by increasing the difference between the depths of the trailing edge step and the leading edge step.

By increasing the difference in the depths between the trailing and leading edges, a slider of the present invention flies with a higher pitch angle without reducing the cavity volume and therefore without reducing the stiffness. In other embodiments of the present invention the combined surface area of the leading edge pads is reduced in order to increase the cavity volume to achieve greater stiffness. Pitch angle is not sacrificed in these embodiments because the leading edge step can be made deeper relative to the trailing edge step in order to compensate for the loss of lift created by the loss of leading edge pad surface area.

A further advantage of the present invention relates to the sensitivities of the various flight characteristics, such as fly height, to deviations in the depths within manufacturing tolerances of the leading and trailing edges. It has been found, for example, that the sensitivity of the fly height to the depth of the trailing edge step combined with the sensitivity of the fly height to the depth of the leading edge step is less than the sensitivity of the fly height to the depth $H_1$ in sliders of the prior art in which the two steps are always at substantially the same depth. Consequently, sliders manufactured according to the present invention have a lower overall sensitivity for the fly height when all the various manufacturing tolerances are summed together.

Additional embodiments of the invention can further include side pads and side steps where the side pads also form part of the ABS and the side steps may be disposed at any intermediate height between the ABS and the cavity. The ability to alter the depths of the side steps allows their relative heights to be used as a method for adjusting flight characteristics such as roll. It will be readily appreciated that a side step closer to the disk will experience greater lift than one further away and that a slider with such an asymmetry will tend to roll in flight. In side rail sliders of the prior art, for example, a certain degree of roll is desirable in order to position the side with the transducer as close to the disk as possible. It is therefore a further advantage of the present invention that roll and other flight characteristics can be adjusted by appropriately controlling the relative depths of the side steps.

A process is also disclosed for the fabrication of a slider of the present invention. The process includes a first cycle of masking, etching, and stripping to form a first level, a second cycle to form a second level, and a third cycle to form a cavity. In the first cycle those portions of the substrate that are to be retained as the ABS are masked and the remainder of the substrate is etched to a first depth. In the second cycle those portions of the substrate that are to be retained as the ABS and those portions that are to be retained as a trailing edge step are masked and the remainder of the surface is etched to a second depth. In the third cycle those portions of the substrate that are to be retained as the ABS, the trailing edge step, and the leading edge step are masked and the remainder of the surface is etched to the depth of the cavity. This process also allows portions of the substrate to be masked and retained to form side pads and side steps in any of the three cycles. The present invention further allows for additional cycles of masking, etching, and stripping to be included so that side steps can be placed at heights other than those of the leading and trailing edge steps. The various embodiments of the process of the present invention are generally advantageous for allowing greater flexibility in the design of sliders that have improved flight characteristics, stiffnesses, and sensitivities.

These and other advantages of the present invention will become apparent to those skilled in the art upon a reading of the following descriptions of the invention and a study of the several figures of the drawings.

DETAILED DESCRIPTION OF THE PREFERRED EMBODIMENTS

Figure 1A:
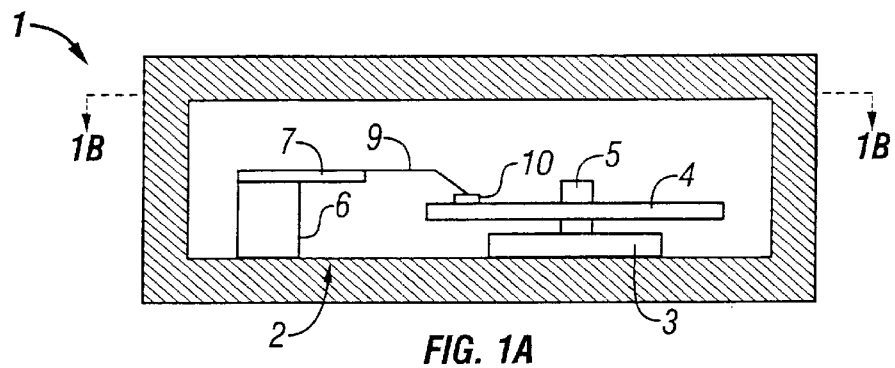
FIG. 1A is a partially sectioned, front elevational view of a magnetic disk drive assembly of the prior art.
Figure 1B:
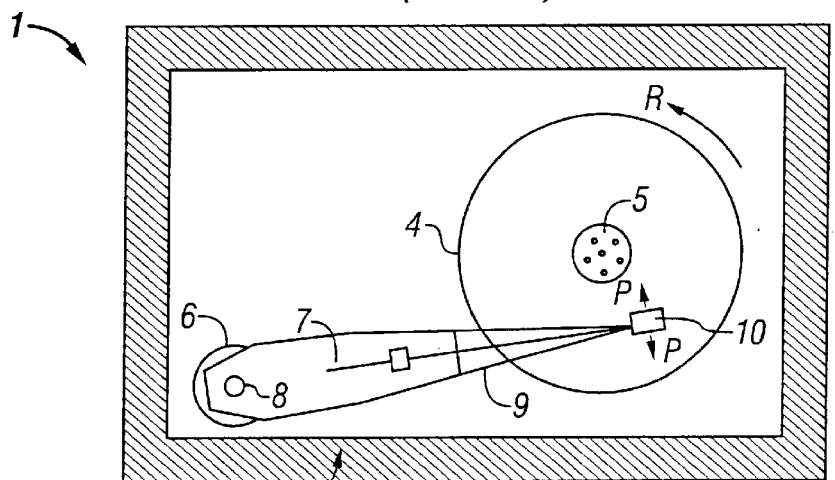
FIG. 1B is a cross section taken along line 1B—1B of FIG. 1A.
Figure 2:
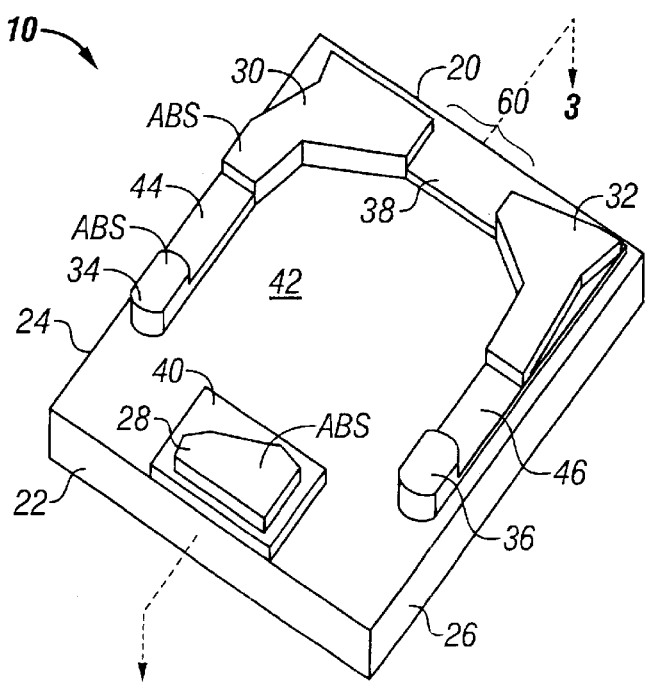
FIG. 2 is a perspective view of a slider of the prior art.
Figure 3A:
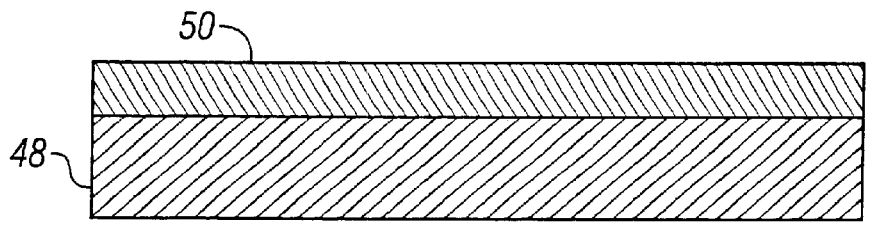
FIGS. 3A–3H show a crosssection of the slider along the line 3—3 in FIG. 2 as it processed through successive steps.
Figure 3B:
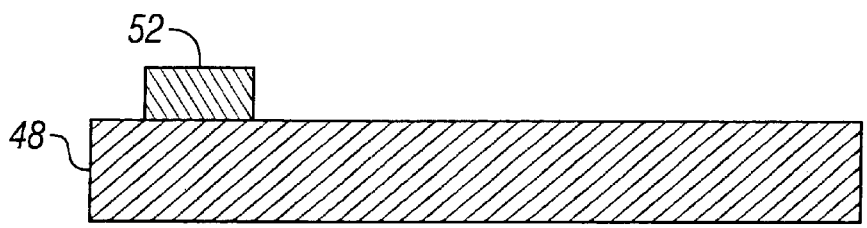
Figure 3C:
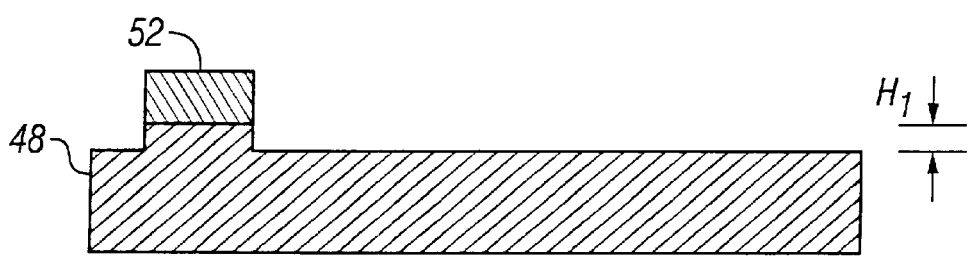
Figure 3D:
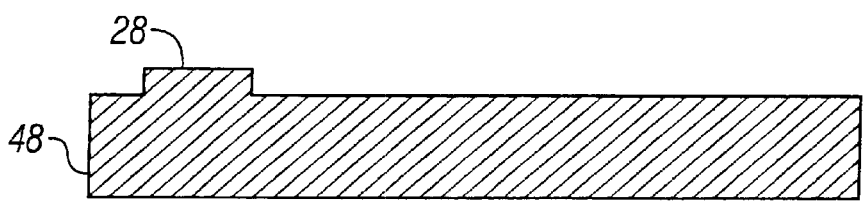
Figure 3E:
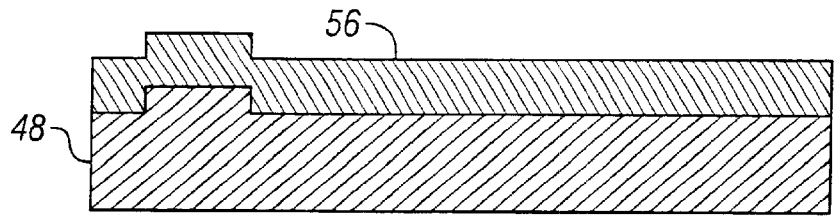
Figure 3F:
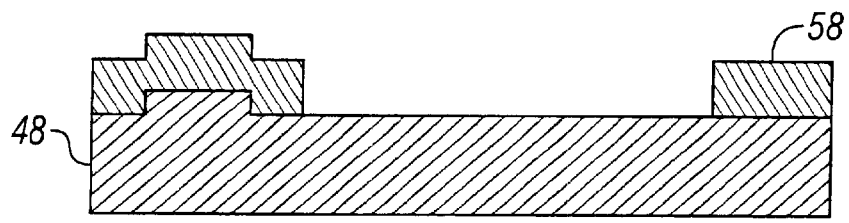
Figure 3G:
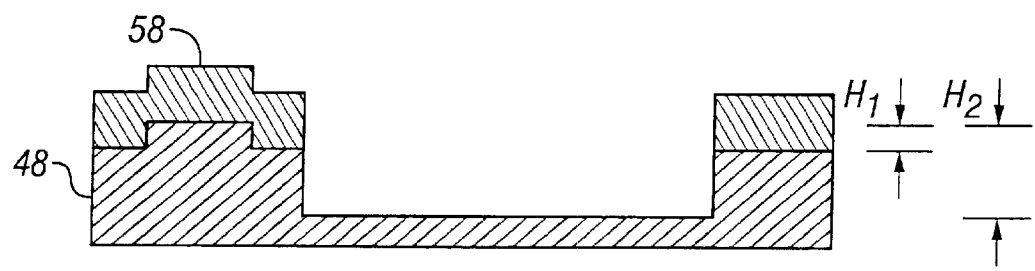
Figure 3H:
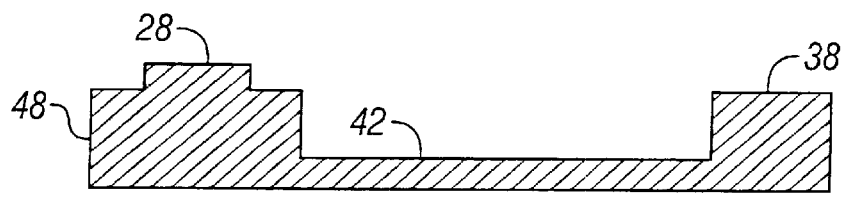
Figure 4:
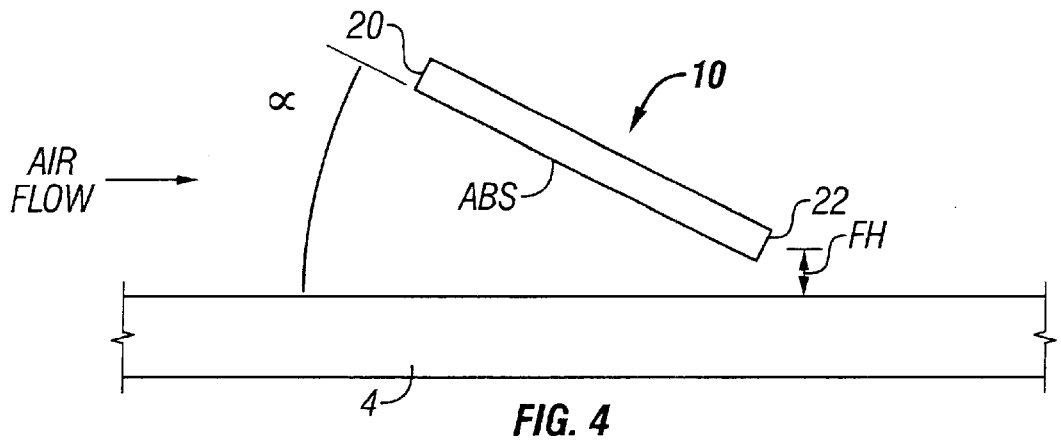
FIG. 4 is shows a side elevational view of the slider of FIG. 2 in flight relative to a magnetic disk.
Figure 5:
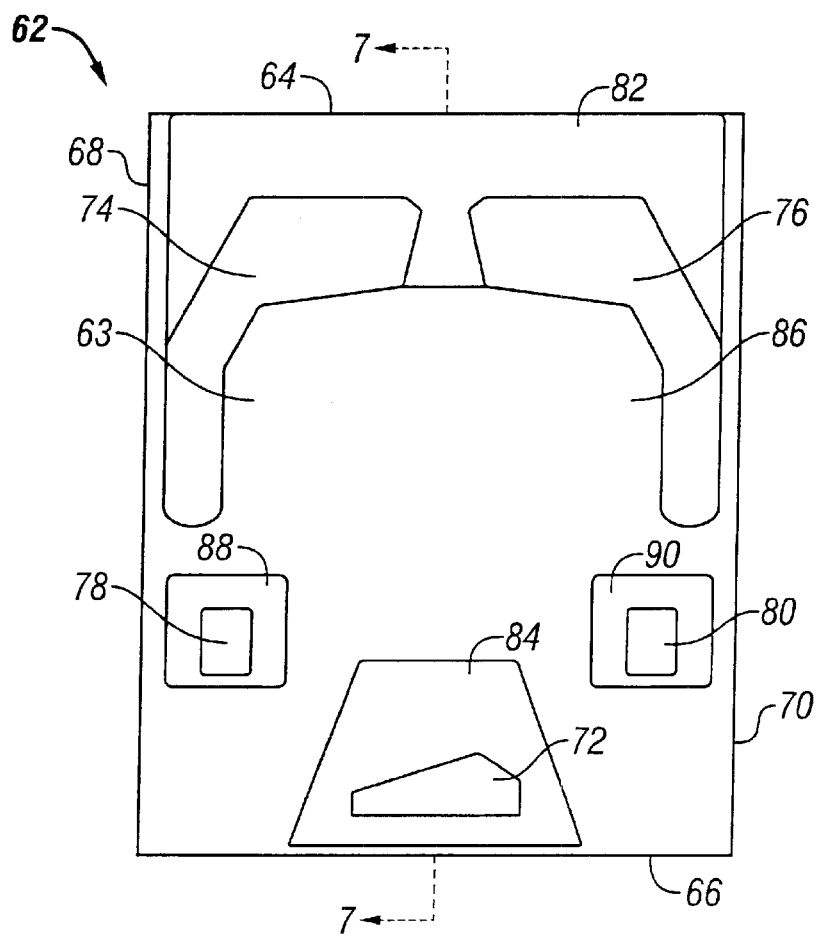
FIG. 5 is a front elevational view of a slider of the present invention.

FIGS. 1–4 have previously been discussed with reference to the prior art. FIG. 5 shows a slider 62 of the present invention. The side 63 of the slider 62 seen in this figure faces the disk 4 (not shown) of the disk drive 1. The slider 62 has a generally rectangular shape with a leading edge 64, a trailing edge 66, a first side 68 and a second side 70. Since the slider 62 flies over the disk 4 with a certain degree of pitch, the leading edge 64 is further from the disk 4 than the trailing edge 66. Slider 62 further includes an ABS comprising a trailing edge pad 72, a first leading pad 74 and a second leading pad 76, and in some embodiments optionally also includes a first side pad 78 and a second side pad 80. The slider 62 additionally includes a leading edge step 82, a trailing edge step 84, and a cavity 86. In additional embodiments the slider 62 also includes a first side step 88 and a second side step 90.

The ABS, comprising pads 72, 74, and 76, and in some embodiments additionally comprising pads 78 and 80, are formed from the same initial surface of a substrate and therefore have top surfaces that are substantially coplanar. Steps 82 and 84, and in some embodiments steps 88 and 90 are each formed by removing material from the substrate down to an appropriate depth. According to the present invention, each of these steps can be recessed a different distance below the ABS. The only limitation imposed by the present invention on the relative depths of the several steps 82, 84, 88, and 90 is that the leading edge step 82 must be recessed below the ABS more than the trailing edge step 84. It is another limitation of the present invention that the cavity 86 is recessed below the ABS further than any of the several steps 82, 84, 88, and 90.

In some embodiments of the present invention the trailing edge step 84 is recessed about $3\mu$" to about $8\mu$" below the ABS, and in preferred embodiments the trailing edge step 84 is recessed about $5\mu$" below the ABS. In some embodiments of the present invention the leading edge step 82 is recessed about $6\mu$" to about $12\mu$" below the ABS, and in preferred embodiments the leading edge step 82 is recessed about $8\mu$" below the ABS. In further embodiments the leading edge step 82 is recessed below the level of the trailing edge step 84 by about $3\mu$" to about $5\mu$". The cavity 86, in some embodiments, is recessed below the ABS about $30\mu$" to about $80\mu$", and in preferred embodiments is recessed about $50\mu$" below the ABS.

Additional embodiments of the present invention are directed to sliders 62 including a first side step 88 but without a second side step 90. In some of these embodiments the first side step 88 is recessed below the ABS by substantially the same distance as the trailing edge step 84, while in other embodiments the first side step 88 is recessed below the ABS by substantially the same distance as the leading edge step 82.

Yet other embodiments are directed to sliders 62 including both a first side step 88 and a second side step 90. In some of these embodiments both side steps 88, 90 are recessed below the ABS by substantially the same distance as the trailing edge step 84, while in other embodiments both side steps 88, 90 are recessed below the ABS by substantially the same distance as the leading edge step 82. In further embodiments the first side step 88 is recessed below the ABS by substantially the same distance as the leading edge step 82 and the second side step 90 is recessed below the ABS by substantially the same distance as the trailing edge step 84. In still other embodiments the first side step 88 is recessed below the ABS by substantially the same distance as either the leading edge step 82 or the trailing edge step 84, while the second side step 90 is recessed below the ABS by a distance substantially different from either the leading edge step 82 or the trailing edge step 84. In yet other embodiments the first side step 88 and the second side step 90 are both recessed below the ABS by a distance substantially different from either the leading edge step 82 or the trailing edge step 84.

It should be noted that the present invention is directed to creating greater variation in the relative depths of the several steps 82, 84, 88, and 90 to allow for sliders 62 with improved flight characteristics. Therefore, it should be understood that other parameters of the various pads 72, 74, 76, 78, 80, steps 82, 84, 88, 90, and the cavity 86, such as surface area, crosssection shape, and relative positions are not meant to be limited by their representations in FIG. 5.

Figure 6:
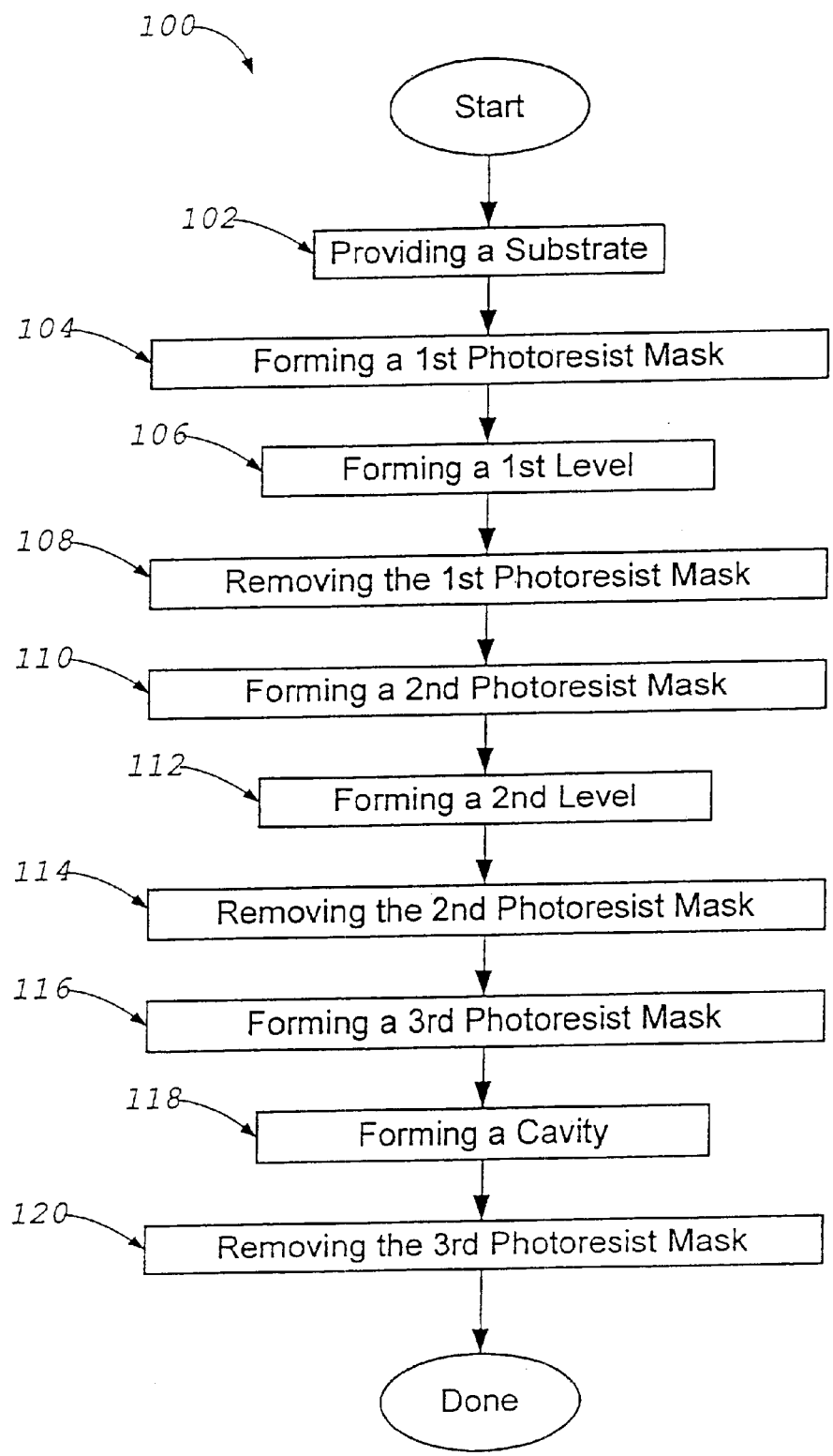
FIG. 6 is a flow chart illustrating a process of making a slider according to the present invention.

FIG. 6 shows a process 100 for making a slider in accordance with the present invention. As indicated, the process 100 for fabricating a slider 62 comprises the acts or operations of providing a substrate 102, forming a first photoresist mask 104, forming a first level 106, removing the first photoresist mask 108, forming a second photoresist mask 110, forming a second level 112, removing the second photoresist mask 114, forming a third photoresist mask 116, forming a cavity 118, and removing the third photoresist mask 120. FIGS. 7A–7J show a crosssection of a substrate 122 as it is processed into a finished slider 62. The crosssection in FIGS. 7A–7J corresponds to the line 7—7 in FIG. 5. FIGS. 7A–7J further illustrate the process 100.

Figure 7A:
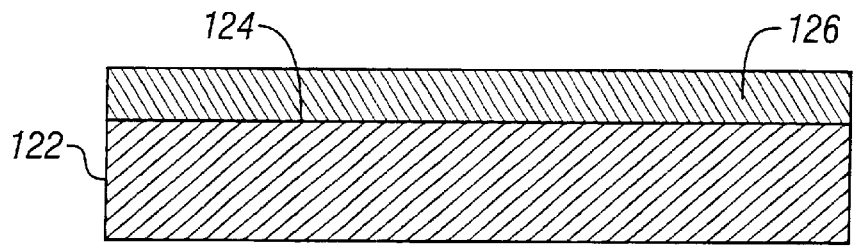
FIGS. 7A–7J show a crosssection of the slider of FIG. 5 along the line 7—7 as it is formed according to the process of FIG. 6.

Act or operation 102 is directed to providing a substrate 122 as shown in FIG. 7A. The substrate 122 is preferably a two-phase mixture of alumninum oxide and titanium carbide, but in other embodiments may be silicon dioxide. The type of material employed is not essential to the present invention so long as it has materials properties similar to those of the materials just mentioned. At a minimum, the substrate material should be electrically insulating and exhibit good wear resistance. As provided, the top surface of the substrate 122, hereinafter known as the initial surface 124, can be either planar or slightly curved. Providing a slight convex curvature to the initial surface 124 can impart improved flight characteristics to the finished slider 62 as well as reduce the contact area between the slider 62 and the disk 4 when the disk drive 1 is not in operation and the slider 62 is parked.

Figure 7B:
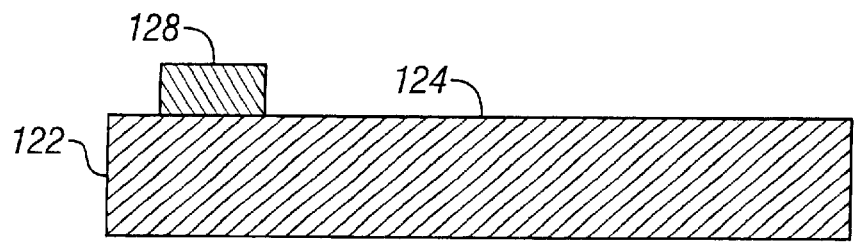

As also shown in FIG. 7A, act or operation 104 of forming a first photoresist mask 128 is preferably accomplished by depositing a layer of an undeveloped photoresist material 126 over the substrate, projecting a pattern of radiation, such as visible light, onto the undeveloped photoresist 126 to selectively alter its chemistry and to create a latent image therein, and exposing the photoresist layer 126 to a developer to selectively remove either the unaltered material or the altered material. Following this series of steps, all of which are well known in the photolithography art, a first photoresist mask 128 will remain above and in contact with the substrate 122 as seen in FIG. 7B. The mask 128 thus formed retains the pattern that was originally projected onto the undeveloped photoresist 126 such that some portions of the substrate 122 remain covered and protected by the mask 128 while other portions are intentionally exposed for further processing. In act or operation 104 the first photoresist mask 128 is formed such that it covers at least the portions of the substrate 122 that ultimately will become the ABS of the finished slider 62. The ABS of the fmished slider 62 will include at least a first leading edge pad 74, a second leading edge pad 76, and a trailing edge pad 72, and may additionally include in some embodiments a first side pad 78 and a second side pad 80.

Figure 7C:
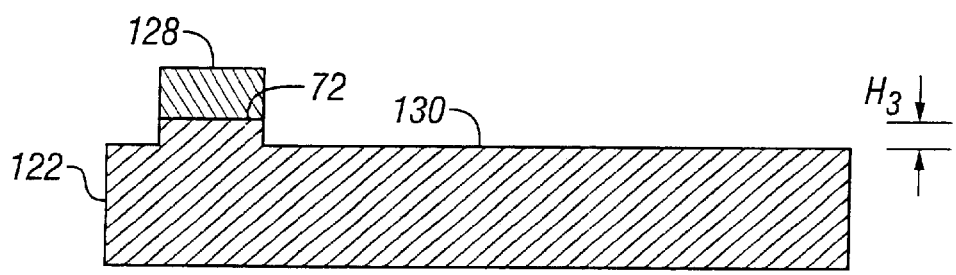

Act or operation 106 of forming a first level 130, shown in FIG. 7C, is accomplished by selectively removing, to a desired first depth $H_3$, portions of the substrate 122 left exposed by the first photoresist mask 129. This is preferably achieved with an etching process such as reactive ion etching (RIE). Act or operation 106 should remove material to substantially the first dept $H_3$ that the trailing edge step 84 is intended to be recessed relative to the ABS. For purposes of the present invention first depth $H_3$ should be about $3\mu"$ to about $8\mu"$ below an initial surface 124 of the substrate 122. More ideally, first depth $H_3$ should be about $5\mu"$ below the initial surface 124. Etching processes useful for removing material from substrate 122 are well known in the art.

Figure 7D:
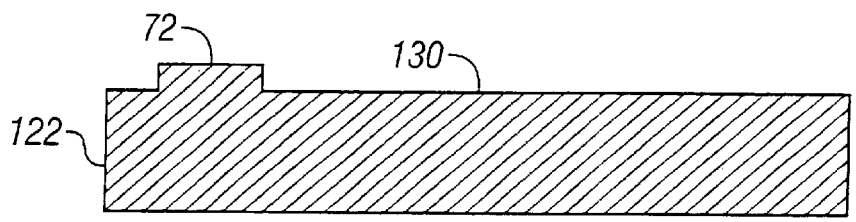

Act or operation 108, removing the first photoresist mask 128, commonly referred to as stripping, is performed in order to clean the substrate 122 for additional photolithography processing steps. Chemical solvents that can readily dissolve the first photoresist mask 128 but that do not attack the material of the substrate 122 are preferred in act or operation 108. Techniques for stripping away photoresist masks are well known in the art, as is represented in FIG. 7D.

Figure 7E:
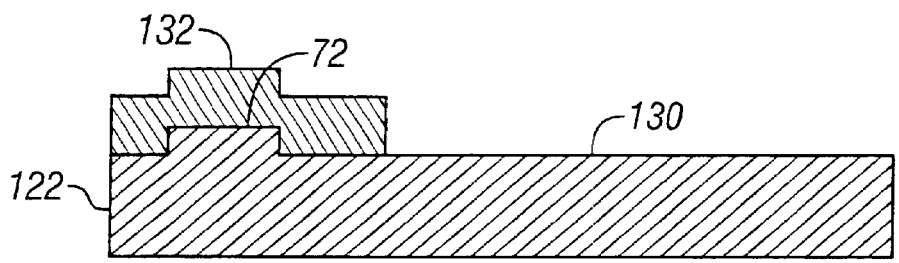

Forming a second photoresist mask 132 in act or operation 110 is accomplished in much the same manner as forming a first photoresist mask 128 in act or operation 104. The second photoresist mask 132 is formed such that it is above and in contact with the substrate 122. As illustrated in FIG. 7E, the second photoresist mask 132 preferably covers and protects at least the portions of the substrate 122 that include the ABS as well as a portion of the first level 130 in a suitable position for the subsequent formation of a trailing edge step 84. In some embodiments the second photoresist mask 132 will additionally cover a portion of the first level 130 that will be retained as a first side step 88. In further embodiments the second photoresist mask 132 will additionally cover a portion of the first level 130 that will be retained as a first side step 88 and another portion of the first level 130 that will be retained as a second side step 90.

Figure 7F:
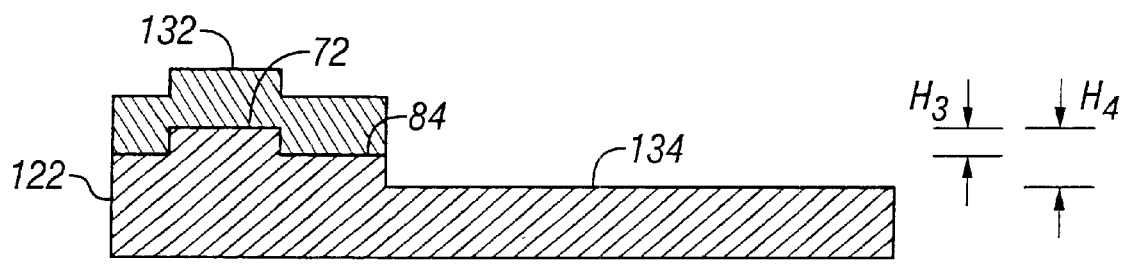

As shown in FIG. 7F, forming a second level 134 in act or operation 112 is accomplished by selectively further removing, to a desired second depth $H_4$, portions of the substrate 122 left exposed by the second photoresist mask 132. Second depth $H_4$ should be substantially the distance that the leading edge step 82 will be recessed relative to the ABS. For purposes of the present invention second depth $H_4$ should be about $6\mu"$ to about $12\mu"$ below the initial surface 124 of the substrate 122. More ideally, second depth $H_4$ should be about $8\mu"$ below the initial surface 124.

The trailing edge step 84 is formed in act or operation 112. Step 84 is formed by removing material from the substrate 122 around an isolated portion of the second photoresist mask 132 located in a suitable position on the first level 130. It will be appreciated by those skilled in the art that the trailing edge step 84 is essentially a pillar with a planar top surface disposed on the surface of the substrate 122. It will be further appreciated that trailing edge step 84 is further formed in subsequent acts or operations as progressively more of the substrate 122 is removed around it and it becomes a lengthier pillar while maintaining the particular cross-section defined in act or operation 112. Lastly, it will be appreciated that the forgoing is true for each of the various pads and steps of the present invention.

In some embodiments act or operation 112 further includes forming a first side step 88 simultaneously with forming the trailing edge step 84. The first side step 88 may be formed nearer to either side 68, 70 of the slider 62, though it happens to be represented in FIG. 5 as being near the first side 68. First side step 88 is formed by removing material from the substrate 122 around a portion of the second photoresist mask 132 located in a suitable position on the first level 130. In further embodiments act or operation 112 further includes forming a first side step 88 and a second side step 90. In these embodiments the second side step 90 will be formed nearer to the side 68, 70 that is opposite to the side 68, 70 nearest the first side step 88. This is accomplished by removing material from the substrate 122 around separate isolated portions of the second photoresist mask 132 located in suitable positions on the first level 130.

Figure 7G:
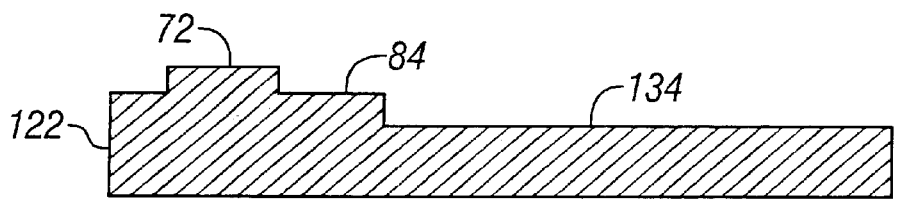
Figure 7H:
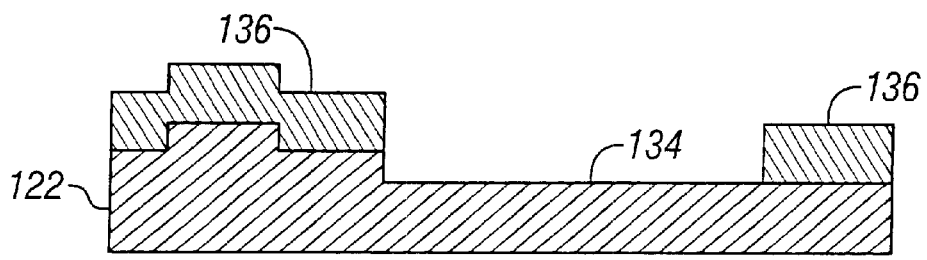

Removing the second photoresist mask 132 in act or operation 114 is accomplished in much the same manner as removing the first photoresist mask 128 in act or operation 108, as can be seen in FIG. 7G. Forming a third photoresist mask 136 in act or operation 116 is accomplished in much the same manner as forming a first photoresist mask 128 in act or operation 104 and a second photoresist mask 132 in act or operation 110 and is represented in FIG. 7H. The third photoresist mask 136 is formed such that it is above and in contact with the substrate 122. The third photoresist mask 136 preferably covers and protects at least the portions of the substrate 122 that include the ABS and the trailing edge step 84, and also serves to cover and protect a portion of second level 134 in a suitable position for the subsequent formation of a leading edge step 82. In those embodiments in which a first side step 88 was formed during act or operation 112 the third photoresist mask 136 additionally covers first side step 88. In those embodiments in which both a first side step 88 and a second side step 90 was formed during act or operation 90 the third photoresist mask 136 additionally covers both steps 88 and 90.

In those embodiments in which a first side step 88 was not formed during act or operation 112, the third photoresist mask 136 in act or operation 116 can additionally cover a portion of the second level 134 to be retained as a first side step 88, and may additionally cover a portion of the second level 134 that will be retained as a second side step 90. In those embodiments in which a first side step 88 was formed during act or operation 112 but a second side step 90 was not formed, the third photoresist mask 136 in act or operation 116 can additionally cover a portion of the second level 134 to be retained as a second side step 90. Put another way, any portion of the substrate 122 that is intended to become either a pad or a step in the finished slider should be covered by the third photoresist mask 136 in this act or operation.

Figure 7I:
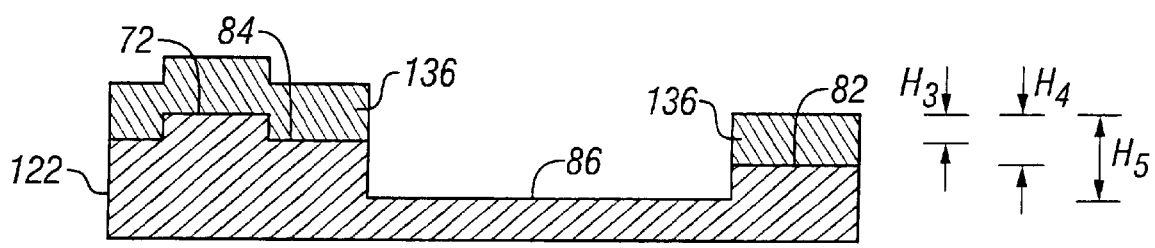
Figure 7J:
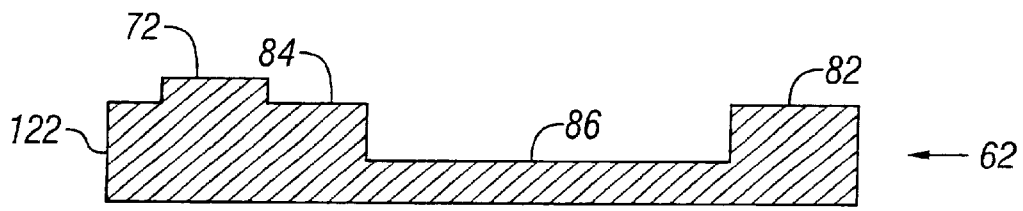

Forming a cavity 86 in act or operation 118, as shown in FIG. 7I, is accomplished in much the same manner as forming a first level 130 in act or operation 106 and forming a second level 134 in act or operation 112. Forming the cavity 86 is accomplished by selectively removing, to a desired third depth $H_5$, portions of the substrate 122 left exposed by the third photoresist mask 136. Act or operation 118 should remove material to substantially the third depth $H_5$ that the cavity 86 is intended to be recessed relative to the ABS. For purposes of the present invention third depth $H_5$ should be about $30\mu"$ to about $80\mu"$ below the initial surface 124 of the substrate 122. More ideally, third depth $H_5$ should be about 50μ" below the initial surface 124. The cavity 86 is formed in act or operation 118 by removing material to the third depth $H_5$ from all portions of the substrate 122 that are not protected by the third photoresist mask 136. Removing the third photoresist mask 136 in act or operation 120, as shown in FIG. 7J, is accomplished in much the same manner as removing the first photoresist mask 128 in act or operation 108 and removing the second photoresist mask 132 in act or operation 114.

While this invention has been described in terms of several preferred embodiments, it is contemplated that alternatives, modifications, permutations and equivalents thereof will become apparent to those skilled in the art upon a reading of the specification and study of the drawings. For example, one of skill in the art will readily appreciate that a first side step 88 can be formed in a separate set of acts or operations from those used to form the trailing edge step 84 and the leading edge step 82 by including into process 100 an additional cycle of mask formation, level formation, and mask removal. Thus, embodiments of slider 62 can be formed in which a first side step 88 and a second side step 90 are both recessed below the ABS by distances substantially different from each other and substantially different from either the leading edge step 82 or the trailing edge step 84.

It will further be appreciated that the present invention encompasses processes, and the sliders 62 formed thereby, in which a pad or a step, such as first side step 88, formed in one act or operation is left either partially or entirely uncovered in a subsequent masking operation Consider, for example, an embodiment of slider 62 in which a first side step 88 is at a depth 1μ" below the depth of a trailing edge step 84, and a second side step 90 is at a depth 1μ" below the depth of a leading edge step 82. To form this slider 62 the first side step 88 could be formed concurrently with the trailing edge step 84 and the second side step 90 could be formed concurrently with the leading edge step 82. In a subsequent series of acts or operations the ABS, the trailing edge step 84, and the leading edge step 84 could all be masked while the first and second side steps 88, 90 are left unmasked so that in the next round of etching both steps 88, 90 are etched 1μ" deeper. This process would include fewer steps than one in which the trailing edge step 84 is formed at a first level, the first side step 88 is formed at a second level, the leading edge step 82 is formed at a third level, and the second side step is formed at a fourth level.

It is therefore intended that the following appended claims include all such alternatives, modifications, permutations and equivalents as fall within the true spirit and scope of the present invention.

What is claimed is:

1. A slider for a magnetic disk drive comprising:
a body including an air bearing surface, a trailing edge step recessed by a first depth about 3μ" to about 8μ" beneath said air bearing surface, a leading edge step recessed by a second depth beneath said air bearing surface, and a cavity recessed by a third depth beneath said air bearing surface, wherein said second depth is between said first depth and said third depth, and said first depth is between said air bearing surface and said second depth.

2. The slider of claim 1 wherein said trailing edge step is recessed about 5μ" below said air bearing surface.

3. The slider of claim 1 wherein said leading edge step is recessed about 6μ" to about 12μ" below said air bearing surface.

4. The slider of claim 1 wherein said leading edge step is recessed about 8μ" below said air bearing surface.

5. The slider of claim 1 wherein said cavity is recessed about 30μ" to about 80μ" below said air bearing surface.

6. The slider of claim 1 wherein said cavity is recessed about 50μ" below said air bearing surface.

7. The slider of claim 1 further including a first side step recessed below said air bearing surface.

8. The slider of claim 1 further including a first side step recessed below said air bearing surface and a second side step recessed below said air bearing surface.

9. The slider of claim 7 wherein said first side step is recessed below said air bearing surface by substantially the same distance as said trailing edge step is recessed below said air bearing surface.

10. The slider of claim 8 wherein said first side step and said second side step are recessed below said air bearing surface by substantially the same distance as said trailing edge step is recessed below said air bearing surface.

11. The slider of claim 7 wherein said first side step is recessed below said air bearing surface by substantially the same distance as said leading edge step is recessed below said air bearing surface.

12. The slider of claim 8 wherein said first side step and said second side step are recessed below said air bearing surface by substantially the same distance as said leading edge step is recessed below said air bearing surface.

13. The slider of claim 8 wherein said first side step is recessed below said air bearing surface by substantially the same distance as said trailing edge is recessed below said air bearing surface and said second side step is recessed below said air bearing surface by substantially the same distance as said leading edge step is recessed below said air bearing surface.

* * * * *